(12) United States Patent
Bergström et al.

(10) Patent No.: US 9,857,916 B2
(45) Date of Patent: Jan. 2, 2018

(54) OPTICAL COUPLING IN TOUCH-SENSING SYSTEMS USING DIFFUSIVELY TRANSMITTING ELEMENT

(71) Applicant: FlatFrog Laboratories AB, Lund (SE)

(72) Inventors: Håkan Bergström, Torna-Hallestad (SE); Ola Wassvik, Brosarp (SE); Thomas Craven-Bartle, Sodra Sandby (SE)

(73) Assignee: FLATFROG LABORATORIES AB, Lund (SE)

( * ) Notice: Subject to any disclaimer, the term of this patent is extended or adjusted under 35 U.S.C. 154(b) by 70 days.

(21) Appl. No.: 14/416,798

(22) PCT Filed: Jul. 22, 2013

(86) PCT No.: PCT/SE2013/050922
§ 371 (c)(1),
(2) Date: Jan. 23, 2015

(87) PCT Pub. No.: WO2014/017973
PCT Pub. Date: Jan. 30, 2014

(65) Prior Publication Data
US 2015/0205441 A1  Jul. 23, 2015

Related U.S. Application Data

(60) Provisional application No. 61/675,032, filed on Jul. 24, 2012.

(30) Foreign Application Priority Data

Jul. 24, 2012 (SE) .................................. 1250890-9

(51) Int. Cl.
*G06F 3/042* (2006.01)
*G02B 6/43* (2006.01)
*G06F 1/16* (2006.01)

(52) U.S. Cl.
CPC ............. *G06F 3/0421* (2013.01); *G02B 6/43* (2013.01); *G06F 1/16* (2013.01); *G06F 2203/04109* (2013.01)

(58) Field of Classification Search
CPC ..................... G06F 3/0421; G06F 1/16; G06F 2203/04109; G02B 6/43
See application file for complete search history.

(56) References Cited

U.S. PATENT DOCUMENTS 3,673,327 A * 6/1972 Johnson ................ G06F 3/0421
178/18.04
4,484,179 A * 11/1984 Kasday ................... G01L 1/247
178/18.01

(Continued)

FOREIGN PATENT DOCUMENTS

EP     2485122 A1    8/2012
WO   WO-2009/077962 A2   6/2009

(Continued)

OTHER PUBLICATIONS

International Search Report dated Dec. 19, 2013 issued in corresponding International Application No. PCT/SE2013/050922.

(Continued)

*Primary Examiner* — Christopher E Leiby
(74) *Attorney, Agent, or Firm* — Harness, Dickey & Pierce, P.L.C.

(57) ABSTRACT

A touch-sensitive apparatus operates by light frustration and comprises a light transmissive panel with a front surface and a rear surface. Light emitters and light detectors optically face the rear surface along a perimeter of a touch-sensitive region on the panel. At least one non-imaging, diffusively transmitting optical element is arranged on the rear surface along the perimeter of the touch-sensitive region. The light emitters are arranged to emit a respective beam of light onto the non-imaging optical element so as to generate, by diffuse (Continued)

transmission, propagating light that propagates by total internal reflection inside the panel across the touch-sensitive region, and the light detectors are arranged to receive detection light generated, by diffuse transmission, as the propagating light impinges on the non-imaging optical element, so as to define a grid of propagation paths across the touch-sensitive region between pairs of light emitters and light detectors.

23 Claims, 5 Drawing Sheets

(56) References Cited

U.S. PATENT DOCUMENTS

| | | | |
|---|---|---|---|
| 5,087,610 A | 2/1992 | Hed | |
| 7,432,893 B2 | 10/2008 | Ma et al. | |
| 7,538,759 B2 | 5/2009 | Newton | |
| 7,995,039 B2 | 8/2011 | Eliasson et al. | |
| 8,093,545 B2 | 1/2012 | Leong et al. | |
| 8,149,221 B2 | 4/2012 | Newton | |
| 8,325,158 B2* | 12/2012 | Yatsuda | B29D 11/00663 345/176 |
| 8,441,467 B2* | 5/2013 | Han | G06F 3/04883 178/18.09 |
| 8,466,901 B2* | 6/2013 | Yen | G06F 3/0421 178/18.09 |
| 8,963,886 B2* | 2/2015 | Wassvik | G06F 3/042 178/18.09 |
| 9,213,445 B2* | 12/2015 | King | G06F 3/0421 |
| 2003/0034935 A1 | 2/2003 | Amanai et al. | |
| 2004/0212603 A1* | 10/2004 | Cok | G06F 3/0412 345/175 |
| 2005/0179977 A1 | 8/2005 | Chui et al. | |
| 2005/0248540 A1 | 11/2005 | Newton | |
| 2005/0276053 A1 | 12/2005 | Nortrup et al. | |
| 2006/0114237 A1 | 6/2006 | Crockett et al. | |
| 2006/0279558 A1* | 12/2006 | Van Delden | G02F 1/13338 345/176 |
| 2008/0088603 A1* | 4/2008 | Eliasson | G06F 3/0312 345/176 |
| 2008/0284925 A1* | 11/2008 | Han | G06F 3/0425 349/12 |
| 2008/0291668 A1* | 11/2008 | Aylward | G02B 6/0068 362/225 |
| 2009/0122020 A1 | 5/2009 | Eliasson et al. | |
| 2009/0122027 A1 | 5/2009 | Newton | |
| 2009/0189857 A1* | 7/2009 | Benko | G06F 3/0421 345/158 |
| 2010/0187422 A1* | 7/2010 | Kothari | G06F 3/0428 250/353 |
| 2010/0295821 A1* | 11/2010 | Chang | G06F 3/0421 345/175 |
| 2010/0302196 A1* | 12/2010 | Han | G06F 3/0425 345/173 |
| 2010/0302209 A1* | 12/2010 | Large | G02B 6/10 345/175 |
| 2011/0043490 A1* | 2/2011 | Powell | G06F 3/0421 345/176 |
| 2011/0051394 A1 | 3/2011 | Bailey | |
| 2011/0163997 A1* | 7/2011 | Kim | G06F 3/0421 345/175 |
| 2012/0217882 A1* | 8/2012 | Wong | F21V 23/0464 315/185 R |
| 2012/0274559 A1* | 11/2012 | Mathai | G02B 5/0278 345/158 |
| 2013/0021302 A1 | 1/2013 | Drumm | |
| 2013/0107569 A1 | 5/2013 | Suganuma | |
| 2013/0135258 A1* | 5/2013 | King | G06F 3/0421 345/175 |
| 2013/0135259 A1 | 5/2013 | King et al. | |
| 2013/0181896 A1* | 7/2013 | Gruhlke | G06F 3/017 345/156 |
| 2013/0300716 A1 | 11/2013 | Craven-Bartle et al. | |
| 2014/0160762 A1 | 6/2014 | Dudik et al. | |
| 2015/0324028 A1* | 11/2015 | Wassvik | G06F 3/042 345/175 |
| 2015/0346856 A1* | 12/2015 | Wassvik | G06F 3/042 345/175 |

FOREIGN PATENT DOCUMENTS

| | | |
|---|---|---|
| WO | WO-2010/015408 A1 | 2/2010 |
| WO | WO-2010/064983 A2 | 6/2010 |
| WO | WO-2011/049511 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/036192 A1 | 3/2013 |
| WO | WO-2013/062471 A2 | 5/2013 |
| WO | WO-2013191638 A1 | 12/2013 |
| WO | WO-2014017973 A1 | 1/2014 |

OTHER PUBLICATIONS

Chen, Yun. "Using micro-structures to couple light into thin lightguides." Master of Science Thesis, Stockholm (2011).
Steindorfer, Michael A. et al. "Light coupling for integrated optical waveguide-based sensors." *Optical Sensing and Detection*, proceedings of the SPIE, vol. 7726, pp. 77261S-1-77261S-10 (2010).
International Search Report dated Apr. 16, 2014 issued in International Application No. PCT/SE2013/051532.
Swedish Search Report dated Nov. 12, 2013 issued in Swedish Application No. 1251437-8.
U.S. Office Action dated Jun. 7, 2017 in U.S. Appl. No. 14/652,760.
U.S. Office Action dated Sep. 28, 2016 in U.S. Appl. No. 14/551,248.
U.S. Office Action dated Apr. 7, 2017 in U.S. Appl. No. 14/551,248.

* cited by examiner

OPTICAL COUPLING IN TOUCH-SENSING SYSTEMS USING DIFFUSIVELY TRANSMITTING ELEMENT

CROSS-REFERENCE TO RELATED APPLICATIONS

This application is the National Phase under 35 U.S.C. §371 of PCT International Application No. PCT/SE2013/050922, which has an International filing date of Jul. 22, 2013, which claims priority to Swedish patent application number SE 1250890-9, filed on Jul. 24, 2012 and to provisional U.S. patent application 61/675,032, filed on Jul. 24, 2012; the entire contents of each of which are hereby incorporated by reference.

TECHNICAL FIELD

The present invention relates to touch-sensing systems that operate by propagating light by internal reflections along well-defined light paths inside a thin light transmissive panel, and in particular to optical solutions for defining the location of the light paths.

BACKGROUND ART

This type of touch-sensing system is known as an FTIR-based system (FTIR, Frustrated Total Internal Reflection). It may be implemented to operate by transmitting light inside a solid light transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

In one configuration, e.g. disclosed in US2006/0114237, the light is coupled into the panel directly through the peripheral edge surface. Such an approach allows the light to be simply and efficiently injected into the panel. Also, such an incoupling does not add significantly to the thickness of the touch system. However, incoupling via the edge surface may require the edge surface to be highly planar and free of defects. This may be difficult and/or costly to achieve, especially if the panel is thin and/or manufactured of a comparatively brittle material such as glass. Incoupling via the edge surface may also add to the footprint of the touch system. Furthermore, it may be difficult to optically access the edge surface if the panel is attached to a mounting structure, such as a frame or bracket, and it is also likely that the mounting structure causes strain in the edge surface. Such strain may affect the optical quality of the edge surface and result in reduced incoupling performance.

U.S. Pat. No. 3,673,327 discloses an FTIR-based touch system in which the emitters and detectors are arranged in rows on opposite ends of the panel, and light beams are propagated between opposite pairs of emitters and detectors so as to define a rectangular grid of propagation paths. Large prisms are attached to the bottom surface of the panel to couple the light beams into and out of the panel.

In U.S. Pat. No. 7,432,893, a few large emitters are arranged at the corners of the panel, or centrally on each side of the panel, to inject diverging light beams ("fan beams") into the panel for receipt by linear arrays of photodiodes along all sides of the panel. Each fan beam is coupled into the panel by a large revolved prism which is attached to the top surface of the panel, and the photodiodes are attached to the top or bottom surface of the panel, so as to define a plurality of propagation paths between each prism and a set of photodiodes.

By attaching prisms or wedges to the top or bottom surfaces, it is possible to relax the surface requirements of the edge surface and/or to facilitate assembly of the touch system. However, the prisms or wedges may add significant thickness and weight to the system. To reduce weight and cost, the wedge may be made of plastic material. On the other hand, the panel is often made of glass, e.g. to attain required bulk material properties (e.g. index of refraction, transmission, homogeneity, isotropy, durability, stability, etc) and surface evenness of the top and bottom surfaces. The present applicant has found that the difference in thermal expansion between the plastic material and the glass may cause a bulky wedge to come loose from the panel as a result of temperature variations during operation of the touch system. Even a small or local detachment of the wedge may cause a significant decrease in the performance of the system.

In the field of LCD display technology, which is outside the field of touch-sensitive systems, it is known to couple light from LEDs into thin waveguide panels as part of so-called backlights (BLUs, Backlight units) for LCD displays. These waveguide panels are located behind the LCD and are configured to emit light from its top surface to uniformly illuminate the rear side of the LCD. Various strategies for coupling light into waveguides for the purpose of back-illuminating LCD displays are disclosed in the publication "Using micro-structures to couple light into thin light-guides", by Yun Chen, Master of Science Thesis, Stockholm 2011, TRITA-ICT-EX-2011:112.

SUMMARY

It is an objective of the invention to at least partly overcome one or more of limitations of prior art FTIR-based touch systems.

One objective is to provide an FTIR-based touch-sensitive apparatus which is robust and compact, while defining light propagation paths with well-defined extent.

Another objective is to enable design of an FTIR-based touch-sensitive apparatus with restricted access to the edge surface.

Yet another objective is to enable an FTIR-based touch-sensitive apparatus that is simple to assemble and suited for mass production.

A still further objective is to provide an FTIR-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

A first aspect of the invention is a touch-sensitive apparatus, comprising: a light transmissive panel that defines a front surface and an opposite, rear surface; a plurality of light emitters and a plurality of light detectors arranged to optically face the rear surface along a perimeter of a touch-sensitive region on the panel; and at least one non-imaging, diffusively transmitting optical element arranged on the rear surface along the perimeter of the touch-sensitive region. The light emitters are arranged to emit a respective beam of light onto the at least one non-imaging optical element so as to generate, by diffuse transmission, propagating light that propagates by total internal reflection inside the panel across the touch-sensitive region. The light detectors are arranged to receive detection light generated, by diffuse transmission, as the propagating light impinges on the at least one non-imaging optical element, so as to define a grid of propagation paths across the touch-sensitive region between pairs of light emitters and light detectors.

In one embodiment, the at least one non-imaging optical element comprises at least one elongate strip of diffusively transmitting material.

In one embodiment, the at least one non-imaging optical element defines a coherent frame that surrounds the touch-sensitive region.

In one embodiment, the at least non-imaging optical element has the shape of a sequence of partially overlapping dots of elliptic shape, preferably circular shape.

In one embodiment, the at least one non-imaging optical element comprises a plurality of spatially separated dots that are arranged along the perimeter of the touch-sensitive region. In one implementation, the dots comprise incoupling dots which are associated with a respective one of the light emitters, wherein the incoupling dots have an extent on the light transmissive panel of $2 \cdot t \cdot \tan(\theta_{min})$ or less, wherein t is the distance between the front and rear surfaces, and $\theta_{min}$ is an angle larger than or equal to the critical angle $\theta_c$ of the panel. In another implementation, the dots comprise outcoupling dots which are associated with a respective one of the light detectors, wherein the outcoupling dots have an extent on the light transmissive panel of at least $2 \cdot t \cdot \tan(\theta_{min})$, and preferably at least $2 \cdot t \cdot \tan(\theta_{max})$, wherein $\theta_{max}$ is the largest TIR angle contributing significantly to interaction.

In one embodiment, the at least one non-imaging optical element is configured to exhibit at least 50% diffuse emission, and preferably at least 90% diffuse emission. In one implementation, the at least one non-imaging optical element is configured to exhibit at least 50% transmission of said diffuse emission. In another implementation, the at least one non-imaging optical element is configured to exhibit less than 50% transmission of said diffuse emission.

In one embodiment, the at least one non-imaging optical element is an essentially Lambertian (near-Lambertian) diffuser.

In one embodiment, the at least one non-imaging optical element is non-refracting, such as a film of diffusing particles.

In an alternative embodiment, the at least one non-imaging optical element comprises refracting structures facing the away from the rear surface.

In one embodiment, the touch-sensitive apparatus further comprises at least one light reflective rear element which is arranged beneath said at least one non-imaging optical element and which defines a light transmissive opening which is aligned with a respective light emitter or light detector. The at least one light reflective rear element may define a light reflective enclosure with respect to said at least one non-imaging optical element. For example, the at least one light reflective rear element may comprise a light reflective rear surface that is spaced from and extends parallel to the non-imaging optical element and one or more light reflective side walls that extend between the light reflective rear surface and the non-imaging optical element.

In one embodiment, the touch-sensitive apparatus further comprises a light reflective top element which is applied onto the front surface opposite to the at least one non-imaging optical element. The light reflective top element may define an opaque frame around the perimeter of the touch-sensitive region and/or the light reflective top element may be configured to be diffusively reflecting to light that impinges on the light reflective top element from within the panel.

In one embodiment, the touch-sensitive apparatus further comprises a light reflective or light absorbing edge element arranged on an edge portion that connects the front surface and the rear surface of the panel adjacent to at least one of: each of the light emitters and each of the light detectors.

In one embodiment, the touch-sensitive apparatus further comprises a light shield arranged intermediate said at least one non-imaging optical element and the rear surface, wherein the light shield is configured to transmit at least a portion of the light emitted by the light emitters while blocking visible light.

In one embodiment, said at least one non-imaging optical element comprises a dye that transmits at least a portion of the light emitted by the light emitters while blocking visible light.

In one embodiment, the light emitters and the light detectors are arranged relative to said at least one non-imaging optical element such that adjacent propagation paths partially overlap along their extent across the touch-sensitive region.

A second aspect of the invention is a touch-sensitive apparatus, comprising: a light transmissive panel that defines a front surface and an opposite, rear surface; a plurality of light emitters arranged to optically face the rear surface along a perimeter of a touch-sensitive region on the panel; a plurality of light detectors optically connected to the panel; and at least one non-imaging, diffusively transmitting optical element arranged on the rear surface along the perimeter of the touch-sensitive region. The light emitters are arranged to emit a respective beam of light onto the at least one non-imaging, diffusively transmitting optical element so as to generate, by diffuse transmission, propagating light that propagates by total internal reflection inside the panel across the touch-sensitive region, and the light detectors are arranged to define a grid of propagation paths across the touch-sensitive region between pairs of light emitters and light detectors.

A third aspect of the invention is a touch-sensitive apparatus, comprising: a light transmissive panel that defines a front surface and an opposite, rear surface; a plurality of light emitters optically connected to the panel so as to generate propagating light that propagates by total internal reflection inside the panel across a touch-sensitive region on the panel; a plurality of light detectors arranged to optically face the rear surface along a perimeter of the touch-sensitive region on the panel; and at least one non-imaging, diffusively transmitting optical element arranged on the rear surface along the perimeter of the touch-sensitive region. The light detectors are arranged to receive detection light generated, by diffuse transmission, as the propagating light impinges on the at least one non-imaging optical element, so as to define a grid of propagation paths across the touch-sensitive region between pairs of light emitters and light detectors.

Any one of the above-identified embodiments of the first aspect may be adapted and implemented as an embodiment of the second and third aspects, as applicable.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1A:
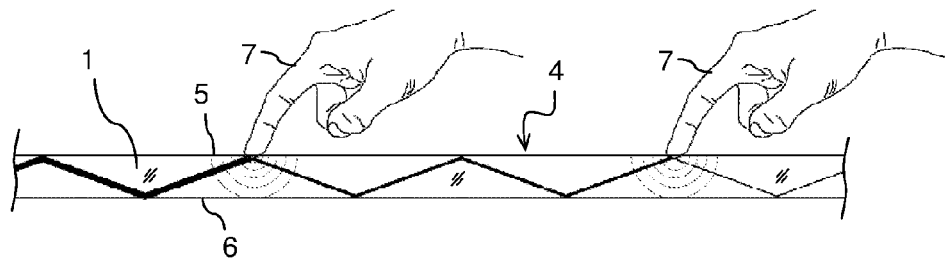
FIG. 1A is a section view of a light transmissive panel using FTIR for touch detection.

In the following, embodiments of the present invention will be presented for a specific example of a touch-sensitive apparatus. Throughout the description, the same reference numerals are used to identify corresponding elements.

FIG. 1A illustrates the concept of touch detection based on attenuation by FTIR (Frustrated Total Internal Reflection) of propagating light. According to this concept, light is transmitted inside a panel 1 along a plurality of well-defined propagation paths. The panel 1 is made of solid material in one or more layers and may have any shape. The panel 1 defines an internal radiation propagation channel, in which light propagates by internal reflections. In the example of FIG. 1A, the propagation channel is defined between the boundary surfaces 5, 6 of the panel 1, and the front (top) surface 5 allows the propagating light to interact with touching objects 7 and thereby defines a touch-sensitive region 4 ("touch surface"). The interaction is enabled by injecting the light into the panel 1 such that the light is reflected by total internal reflection (TIR) in the front surface 5 as it propagates through the panel 1. The light may be reflected by TIR in the rear (bottom) surface 6 or against a reflective coating thereon. It is also conceivable that the propagation channel is spaced from the rear surface 6, e.g. if the panel comprises multiple layers of different materials. The panel 1 may thus be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC). The panel 1 may be designed to be overlaid on or integrated into a display device or monitor (not shown).

As shown in FIG. 1A, an object 7 that is brought into close vicinity of, or in contact with, the touch surface 4 may interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines downstream of the touching objects 7 in FIG. 1A.

Figure 1B:
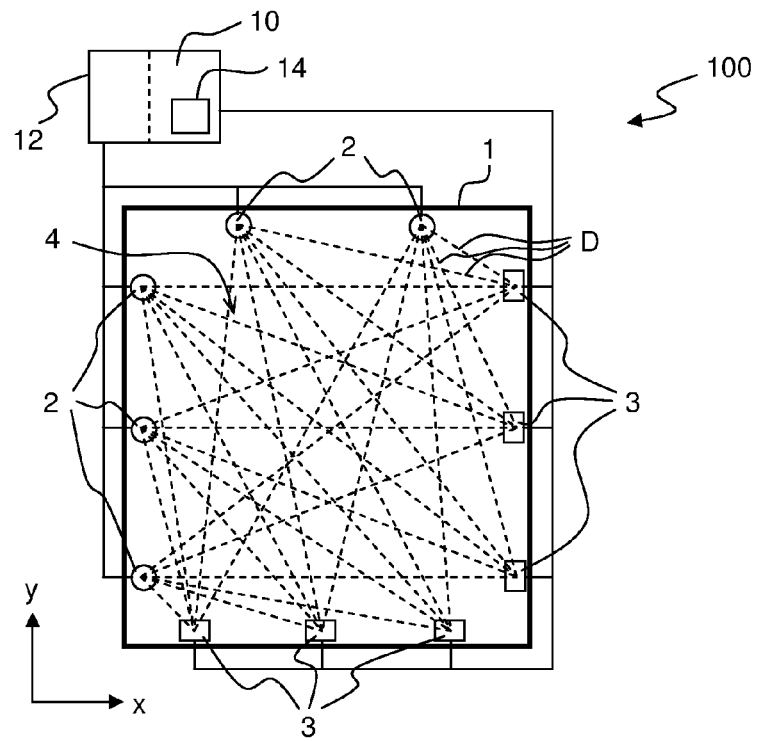
FIG. 1B is a top plan view of an FTIR-based touch-sensitive apparatus.

FIG. 1B illustrates an example embodiment of a touch-sensitive apparatus 100 that is based on the concept of FTIR. Emitters 2 (indicated by open circles throughout the description) are distributed along the perimeter of the touch surface 4, beneath the panel 1, to project light onto the panel 1 such that at least part of the light is captured inside the panel 1 for propagation by internal reflections in the propagation channel. Detectors 3 (indicated by open squares throughout the description) are distributed along the perimeter of the touch surface 4, beneath the panel 1, to receive part of the propagating light. The light from each emitter 2 will thereby propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch surface 4 between pairs of emitters 2 and detectors 3, as shown in FIG. 1B. Thus, the detection lines correspond to a projection of the propagation paths D onto the touch surface 4. Thereby, the emitters 2 and detectors 3 collectively define a grid of detection lines D ("detection grid") on the touch surface 4, as seen in a top plan view. The spacing of intersections in the detection grid defines the spatial resolution of the apparatus 100, i.e. the smallest object than can be detected on the touch surface 4.

As used herein, the emitters 2 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 2 may also be formed by the end of an optical fiber. The emitters 2 may generate light in any wavelength range. The following examples presume that the light is generated in the infrared (IR), i.e. at wavelengths above about 750 nm. Analogously, the detectors 3 may be any device capable of converting light (in the same wavelength range) into an electrical signal, such as a photo-detector, a CCD device, a CMOS device, etc.

The detectors 3 collectively provide an output signal, which is received and sampled by a signal processor 10. The output signal contains a number of sub-signals, also denoted "projection signals", each representing the energy of light received by a certain light detector 3 from a certain light emitter 2. Depending on implementation, the signal processor 10 may need to process the output signal for separation of the individual projection signals. The projection signals represent the received energy, intensity or power of light received by the detectors 3 on the individual detection lines D. Whenever an object touches a detection line, the received energy on this detection line is decreased or "attenuated".

Figure 2:
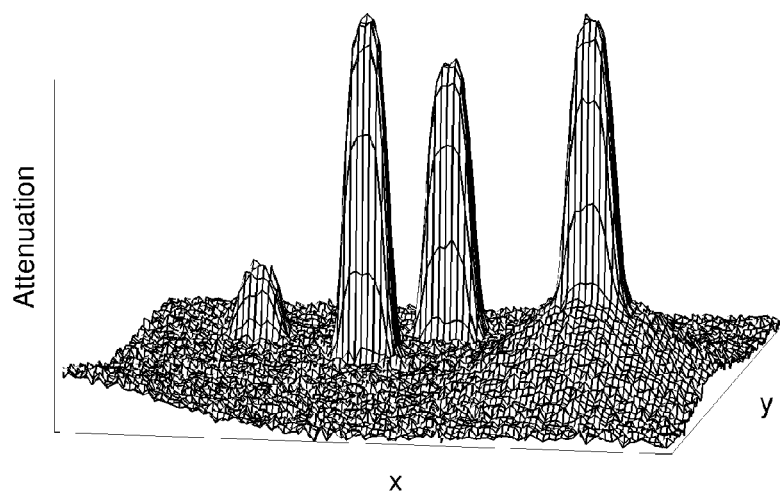
FIG. 2 is a 3D plot of an attenuation pattern generated based on energy signals from an FTIR-based touch-sensitive apparatus.

The signal processor 10 may be configured to process the projection signals so as to determine a property of the touching objects, such as a position (e.g. in the x,y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2, where the peaks of increased attenuation represent touching objects. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

Figure 3:
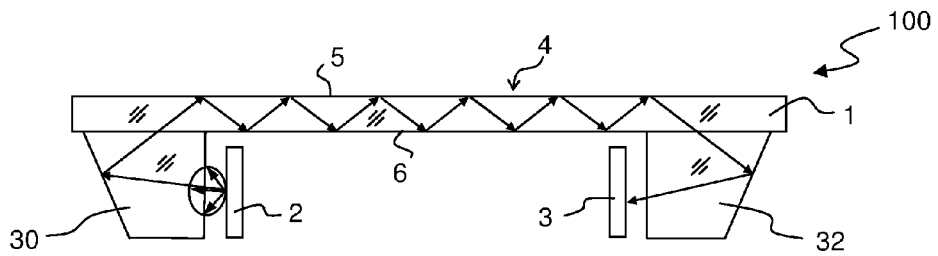
FIG. 3 is a section view of a touch-sensitive apparatus according to the prior art.

FIG. 3 is a section view of a conventional FTIR-based touch-sensitive apparatus 100, in which individual optical incoupling elements 30 (one shown) of light transmissive material are attached to the rear surface 6 of the panel 1 to achieve highly efficient specular coupling of a diverging beam of light from an individual emitter 2 into the panel 1. Correspondingly, individual optical outcoupling elements 32 (one shown) are attached to the rear surface 6 to achieve highly efficient specular coupling of light out of the panel 1 onto an individual detector 3. To achieve efficient coupling of light, the emitters 2 and detectors 3 may need to be precisely mounted in relation to the coupling elements 30, 32, which may be difficult to achieve in mass production. Also, the luminance profile of the light generated by the emitter 2 affects the resulting distribution of light within the panel 1, e.g. the distribution of light between the different detection lines. The use of coupling elements 30, 32 also adds weight and height to the apparatus 100.

Furthermore, the use of individual coupling elements 30, 32 typically results in a width (cross-section) of the detection lines (as seen in a top plan view) which is narrow compared to the center-to-center spacing of adjacent coupling elements. This may lead to an incomplete coverage of the touch surface 4 by the detection lines. Depending on the arrangement of emitters 2 and detectors 3, the incomplete coverage may be pronounced at vertical or horizontal symmetry lines across the touch surface 4 and at the periphery of the touch surface 4 close to the coupling elements 30, 32. Incomplete coverage is likely to cause aliasing artifacts to occur in the reconstructed attenuation pattern, making touch determination more difficult. Furthermore, to reduce system cost, it may be desirable to minimize the number of electro-optical components 2, 3, but a reduced number of components tends to increase the spacing between detection lines and may thus enhance the reconstruction artifacts.

Embodiments of the invention take a fundamentally different approach to generate the detection lines. In one incoupling embodiment, shown in FIG. 4A, each emitter 2 is arranged to optically face the panel 1, and a diffuser 40 is attached to the rear surface 6 next to emitter 2 at the periphery of the touch surface 4, in this example at the rim of the panel 1. The diffuser 40 is configured as a non-imaging component that diffusely transmits a portion of the incoming light into the panel 1. As is well-known to the skilled person, a non-imaging, diffusively transmitting surface will, when illuminated, emit light over a large solid angle at each location on the surface, as indicated by encircled rays 42 on the drawings. The diffuse transmission is governed by "scattering" (also known as a combination of "diffuse reflection" and "diffuse transmission") which refers to reflection, refraction and interference (diffraction) of light at a surface as well as by particles dispersed in the bulk beneath the surface, such that an incident ray is scattered at many angles rather than being reflected at just one angle as in "specular reflection" or "specular transmission". Thus, part of the incoming light from the emitter 2 (one ray shown in FIG. 4A) will be scattered by the diffuser 40, and a portion of this light will be transmitted into the panel 1. As is well-known to the skilled person, a "non-imaging" optical component is, in contrast to an imaging optical component, not designed with respect to the phase of the incoming light e.g. for the purpose of forming an image of a light source in a focal plane or generating a highly collimated beam of light, but is instead designed to achieve a dedicated optical radiative transfer of light from a source onto a target regardless of the phase of the light.

Accordingly, when illuminated, the diffuser 40 will act as a light source ("secondary light source") which is located in contact with the propagation channel inside the panel 1 to emit diffuse light. The secondary light source thereby defines the actual origin of the detection lines that are generated by the light from the respective emitter 2. Since the diffuser 40 more or less randomly re-distributes the incoming light, the importance of the luminance profile of the emitter 2 is reduced or even eliminated. This means that the diffuser 40 has the ability to act as a secondary light source for many different types of emitters 2 and for many different relative orientations between the emitter 2 and the diffuser 40, as long as the light from the emitter 2 hits the diffuser 40 with a proper extent and at a proper location. Thus, compared to conventional coupling elements that operate by optical imaging, the sensitivity to manufacturing and mounting tolerances is reduced and assembly of the apparatus 100 is facilitated. This makes the apparatus 100 better suited for mass production. The diffuser 40 may be designed as a low cost component that adds little thickness and weight to the apparatus 100. Since the diffuser 40 is arranged at the rear surface 6, it is possible to keep the front surface 5 free of additional layers and components. This may be a desirable design feature (known as "flush" or "edge-to-edge") in the field of touch systems. Furthermore, the diffuser 40 allows light to be coupled into the panel 1 irrespective of the quality and design of the edge surface.

The diffuser 40 may be provided as a thin, sheet-like element on the rear surface 6. Such a sheet-like diffuser 40 may be so thin and flexible that it is able to absorb shear forces that may occur in the interface between the diffuser 40 and the panel 1, e.g. caused by differences in thermal expansion as discussed in the Background section. The diffuser 40 may e.g. be a coating, layer or film applied to the rear surface 6.

Figure 4A:
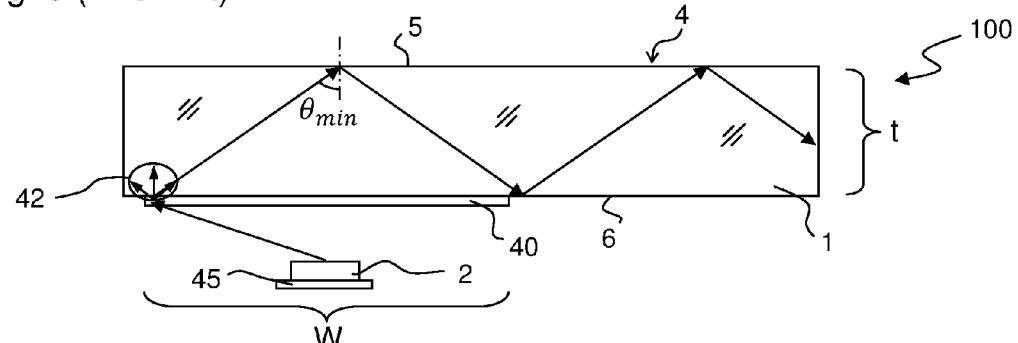
FIGS. 4A-4B are section views of diffusive incoupling and outcoupling according to embodiments of the invention.

The use of the diffuser 40 also enables a compact design of the apparatus 100. As shown in FIG. 4A, the emitter 2 may be arranged on a connecting substrate 45 such as a PCB (Printed Circuit Board) which is designed to supply power and transmit control signals to the emitter 2. In FIG. 4A, the emitter 2 is mounted vertically on the PCB 45 and configured to emit divergent or diffuse light through its top surface towards the diffuser 40, and thereby the PCB 45 may be arranged flat along the rear surface 6. However it is to be understood that FIG. 4A is only an example, and that the emitter 2 may be mounted to, or be inherently configured to, emit divergent, collimated or diffuse light at a non-perpendicular angle to the diffuser 40.

The diffuser 40 will emit the transmitted light in a large solid angle into the panel 1. Thereby, light is transmitted omnidirectionally from the diffuser 40 as seen in plan view (cf. FIG. 5A). Furthermore, light is transmitted with a given divergence transversely to the plane of the panel, e.g. as indicated by the encircled rays 42 in the cross-section of FIG. 4A. This divergence (defined by off-axis angles where the luminous intensity is 50% of the on-axis value) is typically at least 20°, 30°, 40°, or 50°, in all directions. In one embodiment, the diffuser is near-Lambertian and has a divergence of approximately 60° in all directions in the plane of the panel. It is realized that only the diffusively transmitted light rays that hit the front surface 5 at an angle equal to or larger than the critical angle $\theta_c$ will propagate by TIR. The critical angle $\theta_c$ is given by Snell's law and is well known to the skilled person.

The diffuser 40 may be optimized, e.g. with respect to its thickness, structure, etc, to achieve a given relation between specular reflection and transmission, on one hand, and diffuse reflection and transmission, on the other hand. This relation may be expressed by a scatter fraction, which defines the fraction of light that is scattered (i.e. diffusely reflected and transmitted). The diffuser 40 may also be optimized to achieve a given relation between the diffusively reflected light that leaves the diffuser on the side facing the panel (i.e. the diffusively transmitted light) and the diffusively reflected light that leaves the diffuser 40 on the side facing away from the panel 1. This relation may be expressed by a "diffusive transmission ratio", given by diffuse transmission to diffuse reflection. Light that is specularly reflected by the diffuser 40 may result in coupling losses, and it is thus preferred that the scatter fraction is high for the diffuser 40. It is currently believed that reasonable performance may be achieved, at least for smaller touch surfaces, with a scatter fraction of at least 50%. Preferably, the scatter fraction is at least about 60%, 70%, 80%, 90%, 95%, or 99%. The diffusive transmission ratio will influence the impact that the main direction of the incoming light has on the main direction of the diffusively transmitted light. Generally, a low diffusive transmission ratio will cause the light, on a macroscopic scale, to be transmitted in a large solid angle at a given angle (typically at right angles) to the diffuser 40 inside the panel 1 irrespective of the angle of incidence of the incoming light on the other side of diffuser 40. A high diffusive transmission ratio will instead cause the scattered light distribution to be more or less aligned with the main direction (the direction after refraction in the scattering bulk) of the incoming light. Thus, in certain embodiments, to reduce the dependence on incoming light, the diffuser 40 may be designed with a diffusive transmission ratio of less than 50%, 40%, 30%, 20% or 10%. However, this results in poor coupling efficiency, which may be improved by the use of dedicated light recycling structures (e.g. as shown in FIG. 7C and described below). In other embodiments, the diffuser 40 may have a diffusive transmission ratio of more than 50%, 60%, 70%, 80% or 90%, e.g. when the emitter 2 is arranged and/or configured to emit a beam of light with a main direction that causes a significant portion of the diffusively transmitted light to hit the front surface 5 at an angle that sustains TIR propagation inside the panel 1.

In one embodiment, the diffuser 40 is configured without refracting structures. Such a diffuser 40 may be implemented as a film of diffusing particles in a simple, robust and cost effective manner. The film may be applied to the rear surface 6 by painting, spraying, lamination, gluing, etc. Any inherently translucent material may be used for forming the film, e.g. a matte white paint or ink. However, the paint may be optimized to obtain a desired diffusive transmission ratio, e.g. by including pigments with low refractive index or spherical objects of different materials. One such pigment is $SiO_2$, which has a refractive index n=1.6. There are many dedicated materials that are commercially available, e.g. the fluoropolymer Spectralon, barium-sulphate-based paints or solutions, granular PTFE, microporous polyester, Makrofol® polycarbonate films provided by the company Bayer AG, etc.

In another embodiment, the diffuser 40 comprises refracting structures on the side facing the away from the rear surface 6. In such a diffuser, also known as an engineered diffuser, the refracting structures may be implemented as an arrangement (typically random or pseudo-random) of microstructures tailored to generate a desired diffuse transmission. Examples of engineered diffusers include holographic diffusers, such as so-called LSD films provided by the company Luminit LLC. In a variant, the engineered diffuser is tailored to promote diffuse transmission into certain directions in the surrounding hemisphere, in particular to angles that sustain TIR propagation inside the panel 1. The engineered diffuser may, in addition to the refractive structures, include diffusing particles. The engineered diffuser may be provided as a separate flat or sheet-like device which is attached to the rear surface 6 e.g. by adhesive. Alternatively, the diffuser 40 may be provided in the rear surface 6 by etching, embossing, molding, abrasive blasting, etc.

In incoupling embodiments, the diffuser 40 may be configured with respect to a minimum design angle $\theta_{min}$ for the light that propagates by TIR inside the panel 1. The minimum design angle $\theta_{min}$ may be set equal to the critical angle $\theta_c$ or there above. The minimum design angle $\theta_{min}$ corresponds to a minimum distance between consecutive bounces in the rear surface 6, given by: $2 \cdot t \cdot \tan(\theta_{min})$, with t being the thickness of the panel 1. By configuring the diffuser 40 with a width W (FIG. 4A) that is at most approximately equal to this "bounce distance at the minimum design angle", light transmitted by the diffuser 40 and impinging on the front surface 5 at $\theta_{min}$, or there above, will not be reflected back onto the diffuser 40. The diffuser 40 thereby promotes generation of propagating light that impinges on the front and rear surfaces 5, 6 at angles of $\theta_{min}$ or there above.

Figure 4B:
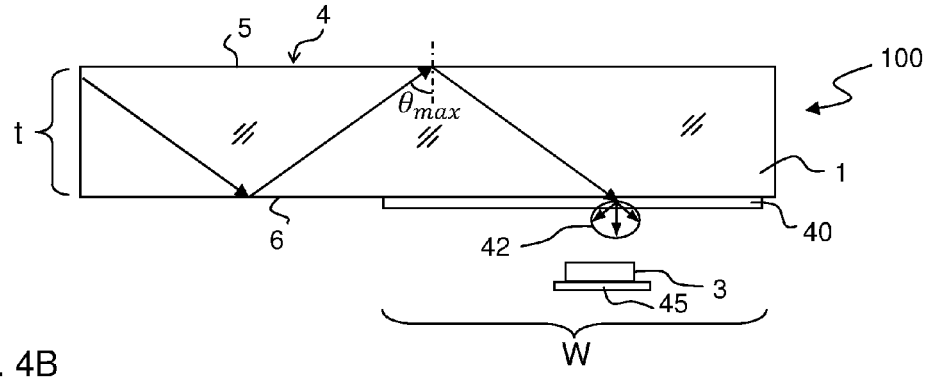

In one outcoupling embodiment, shown in FIG. 4B, each detector 3 is arranged to optically face the panel 1, and a diffuser 40 is attached to the rear surface 6 next to detector 3 at the periphery of the touch surface 4, in this example at the rim of the panel 1. The diffuser 40 diffusely transmits a portion of the incoming propagating light, whereby at least part of the diffusively transmitted light reaches the detector 3. Accordingly, each diffuser 40 will act as a light source ("secondary light source") that diffusively emits "detection light" for receipt by the detector 3. The secondary light source thereby defines the direction of the detection lines from the emitters 2 across the touch surface 4. The diffuser 40 in FIG. 4B may be configured in the same way as the diffuser 40 in FIG. 4A, to attain corresponding advantages. In the illustrated embodiment, the detector 3 is attached to a PCB 45 which is designed to supply power to and transmit measurement data from the detector 3. The use of the diffuser 40 allows the PCB 45 to be arranged flat alongside the rear surface 6.

In outcoupling embodiments, the diffuser 40 may have a width W (FIG. 4B) that is approximately equal to, or larger than, the above-mentioned "bounce distance at the minimum design angle". In certain embodiments, it may be advantageous to set the width W approximately equal to, or larger than, the bounce distance at the largest TIR angle, $\theta_{max}$, that yields a significant interaction between the propagating light and touching objects. This ensures that all the relevant propagating light (i.e. the propagating light that has interacted with touching objects, if present) hits the diffuser 40 at least once. The TIR angle $\theta_{max}$ (FIG. 4B) is larger than the minimum design angle and may be e.g. 70°, 75° or 80°, depending on implementation (wavelength of light, type of object, structure of front surface, material of panel, etc).

It is to be understood that the apparatus 100 may implement the diffusive coupling technique only for incoupling (or outcoupling), while employing conventional coupling techniques for outcoupling (or incoupling), e.g. by dedicated coupling elements as shown in FIG. 3, by direct attachment to the front or rear surface, or by optical coupling via the edge surface as discussed in the Background section. However, additional technical advantages are achieved by implementing the diffusive coupling technique for both incoupling and outcoupling (denoted "combined diffusive coupling" in the following). For one, the assembly of the apparatus 100 may be further facilitated and more suitable for mass production Eliminating dedicated optical coupling elements may yield reductions in terms of cost, weight and thickness. Furthermore, the same (or a similar) diffuser 40 may be used for both incoupling and outcoupling, and the impact of tolerances in the placement of the emitters and detectors with respect to the panel may be reduced.

Another technical advantage of combined diffusive coupling is that it enables simple optical coupling to the panel 1 of a sequence of electro-optical components (emitters 2, detectors 3, or both) that are arranged along one and the same side of the touch surface 4. Furthermore, it is possible to generate broad detection lines D, e.g. to cause the detection lines D of adjacent components 2, 3 to partly overlap, if desired. Still further, the components 2, 3 may be arranged in close proximity to each other beneath the panel 1, if desired, while achieving proper incoupling and outcoupling of light.

Figure 5A:
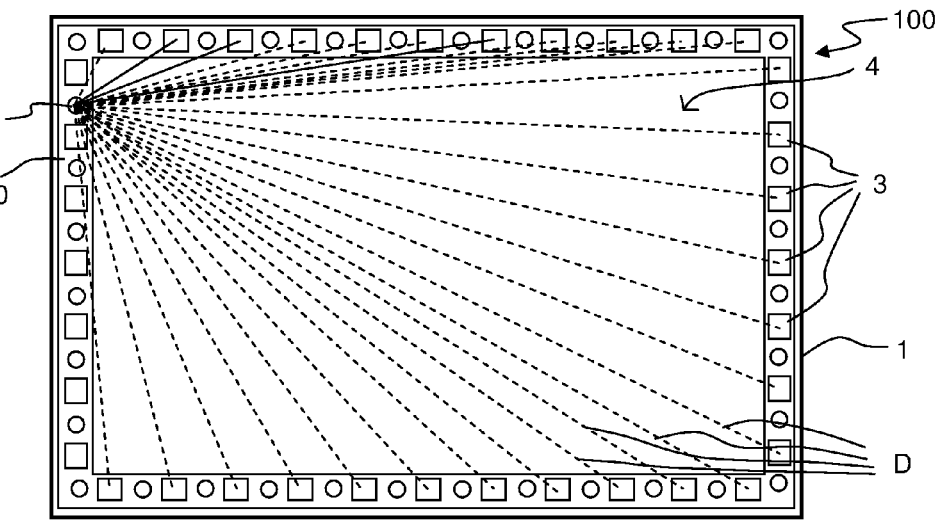
FIG. 5A is a top plan view of a touch-sensitive apparatus according to one embodiment.

In a first embodiment with combined diffusive coupling, the diffusers 40 are implemented by a coherent band or strip of diffusively transmitting material that extends along a portion outside the perimeter of the touch surface 4, and the emitters 2 and detectors 3 are arranged beneath the panel 1 along the extent of the strip 40. One example of the first embodiment is shown in plan view in FIG. 5A. The emitters 2 and detectors 3 are alternated around the entire perimeter of the touch surface 4 and the strip 40 forms a frame around the touch surface 40. For the purpose of illustration, the emitters 2 and detectors 3 are made visible through the strip 40. FIG. 5A also schematically indicates the detection lines D that are defined between one emitter 2 on one side of the rectangular touch surface 4 and the detectors 3 on the other sides of the touch surface 4.

Figure 5B:
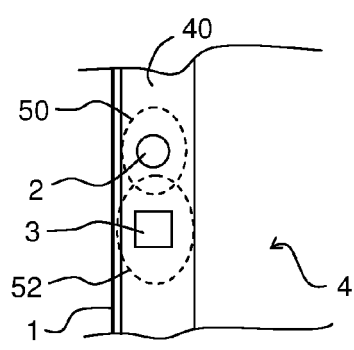
FIGS. 5B-5C are enlarged views to illustrate characteristics of the embodiment in FIG. 5A.

FIG. 5B is an enlarged view of the panel in FIG. 5A and shows one emitter 2 and one detector 3 beneath the strip 40. The dashed line 50 indicates the region of the strip 40 that is illuminated by the emitter 2 and thus defines a region of origin for the light that is propagated along the associated detection lines (not shown). The dashed line 52 similarly indicates the projection of the field of view of the detector 3 onto the strip 40 and thus defines a region of origin for the light that is received by the detector 3 on associated detection lines (not shown). It is thus realized that the detection lines associated with the adjacent emitter 2 and detector 3 in FIG. 5B may be brought to partly overlap by controlling the overlap of the projection regions 50, 52 on the strip 40. The cross-section of detection lines created in this way is broad with long tails, with overlap between the detection lines from neighboring components 2, 3. Thus, by broadening the detection lines, the coverage of the touch surface 4 may be improved. The broadening of the detection lines effectively corresponds to a low pass filtering of the projection signals, which may enable a reduction of reconstruction artifacts.

The coherent strip 40 also has the advantage of reducing the mounting tolerances of the components 2, 3 in relation to the panel 1, since detection lines will be defined as long as the projection regions 50, 52 fall within the strip 40.

Figure 5C:
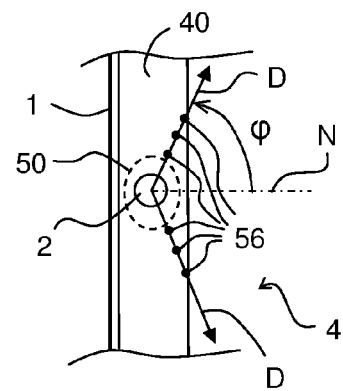

One potential drawback of the coherent strip 40 in FIG. 5A is that detection lines D that extend at large angles φ to the normal N of the strip 40 (in the plane of the panel 1) may exhibit a poor transfer efficiency if the propagating light hits the strip 40 outside of the respective projection region 50, 52. Each hit will result in a diffusive transmission of light and thus a loss of propagating light. This phenomenon is further illustrated in FIG. 5C, where the light that originates from a projection region 50 of an emitter 2 and propagates by internal reflections along two detection lines D hits the strip 40 at three locations 56 outside the projection region 50. The impact of this "self-scattering phenomenon" may be reduced by setting the width of the strip 40 essentially equal to the bounce distance at the minimum design angle, as explained in relation to FIG. 4A above. However, the self-scattering may still affect the detection lines D that extend close to and along the edges of the touch surface 4 (cf. FIG. 5A), potentially resulting in poor performance in these regions.

Figure 6A:
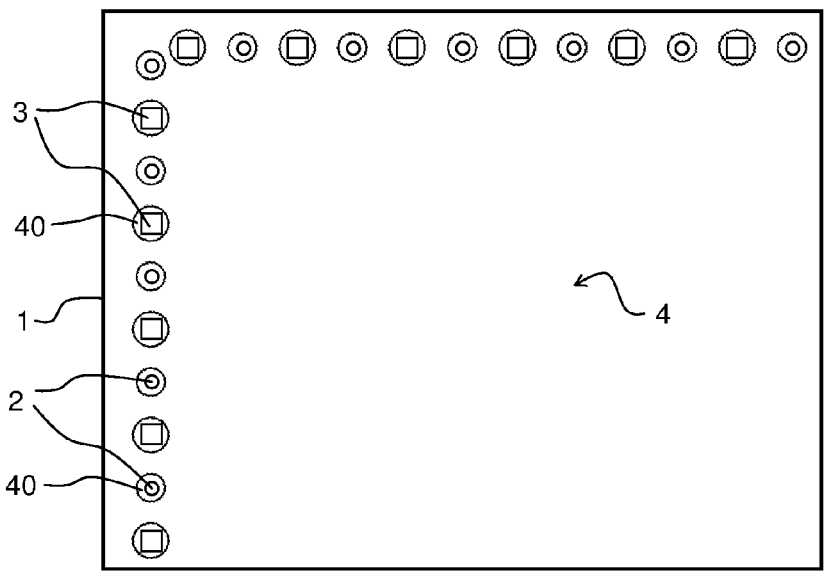
FIGS. 6A-6B are top plan views of a touch-sensitive apparatus according to other embodiments.

The self-scattering may be overcome by a second embodiment with combined diffusive coupling, in which the diffusers 40 are configured as dots of diffusively transmitting material on the rear surface 6. It may be preferable for the dots 40 to be elliptic, e.g. approximately circular, although other shapes are conceivable, e.g. polygons. FIG. 6A is a top view of a corner portion of an apparatus 100 that implements the second embodiment. For the purpose of illustration, the emitters 2 and detectors 3 are made visible beneath the dots 40, which thus are located directly above a respective emitter/detector. It is realized that the use of confined and spatially separated dots 40 will reduce the impact of self-scattering on the detection lines D that extend close to and along an edge of the touch surface 4.

In this specific example, the dots 40 above the detectors 3 are larger than the dots 40 above the emitters 2, for the purpose of increasing the detection efficiency. Other configurations are possible. Generally, the distribution and size of the dots 40 may be optimized with respect to maximizing the coverage of the touch surface 4 by the detection lines while minimizing the impact of self-scattering.

Figure 6B:
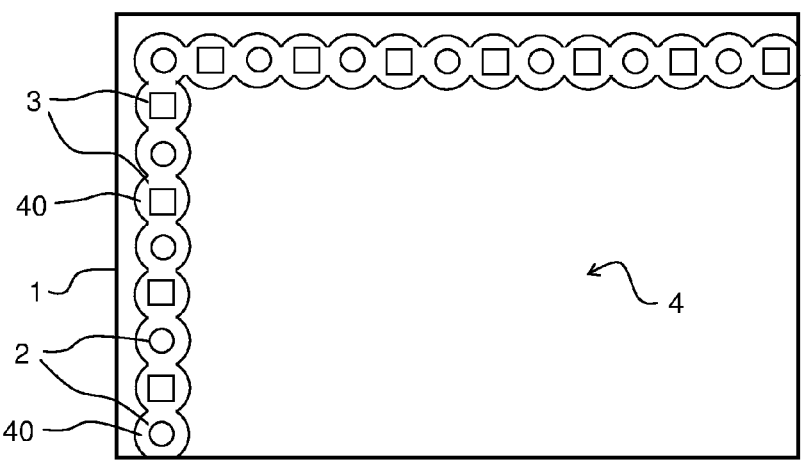

FIG. 6B illustrates a variant in which adjacent dots 40 are arranged to partially overlap while still reducing the amount of self-scattering. This variant may be seen as a hybrid of the strip in FIG. 5A and the separated dots in FIG. 6A, since the overlapping dots 40 effectively form a coherent strip with an undulating border towards the touch surface for reduction of self-scattering. The overlapping dots may be implemented as a coherent strip which is attached to the panel 1.

To optimize coupling efficiency, the projection regions 50, 52 may be matched to the extent of the respective dot 40. However, a perfect match may introduce undesirably strict tolerance requirements, e.g. with respect to the performance of individual components 2, 3 and the placement of the components 2, 3. Furthermore, the distance between the panel 1 and the components 2, 3 may change slightly when the touch surface 4 is being touched, causing variations in the size of the projections regions 50, 52 and thus variations in the projection signals. It may therefore be desirable to ensure that, nominally, the projection regions 50 (the beam spot) of the emitters 2 are smaller than and are included within the respective dot 40, and the projection regions 52 of the detectors 3 are larger than and include the respective dot 40.

FIGS. 7A-7D illustrate modifications to the incoupling embodiment in FIG. 4A.

Figure 7A:
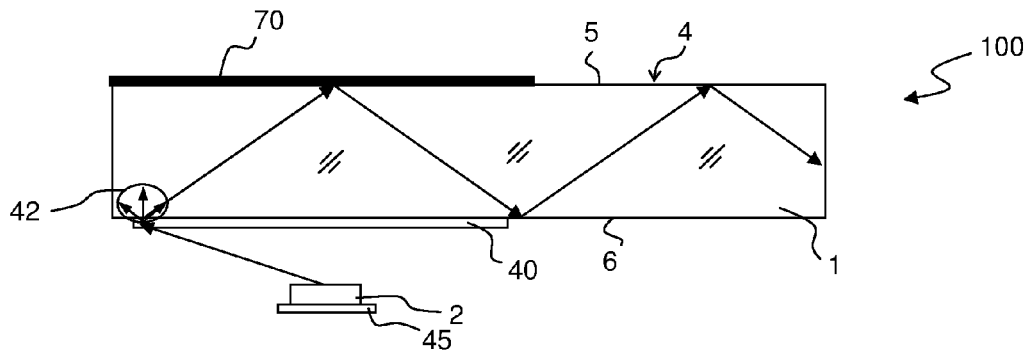
FIGS. 7A-7D are section views of variants of the diffusive incoupling in FIG. 4A.

In FIG. 7A, a reflective element 70 is applied to the front surface 5 in alignment with the diffuser 40. The reflective element 70 may be reflective on the side facing the panel 1, such that light that is transmitted by diffuser 40 at an angle smaller than the above-mentioned critical angle (and therefore will not propagate by TIR in the panel 1) is reflected back into the panel 1. This light is denoted "leakage light" in the following. The element 70 may thereby serve to increase the efficiency of the incoupling, by recycling a portion of the leakage light. In one implementation, the reflective element 70 is configured for primarily specular reflection, whereby leakage light may be reflected back towards the diffuser 40, which may diffusively reflect a portion of leakage light into angles that sustain propagation by TIR. In another implementation, the reflective element 70 is instead configured for diffuse reflection, which may significantly increase the portion of leakage light that is recycled.

In one embodiment, the element 70 is also configured to hide the diffuser 40 and also the internal structure of the apparatus 100 from view. To this end, the element 70 may be non-transmissive (opaque) to visible light. The element 70 may also be designed to block ambient light in the IR region.

The element 70 may be implemented as a coating or film, in one or more layers. For example, an inner layer may provide the specular or diffuse reflectivity, and an outer layer may block ambient and/or visible light.

Figure 7B:
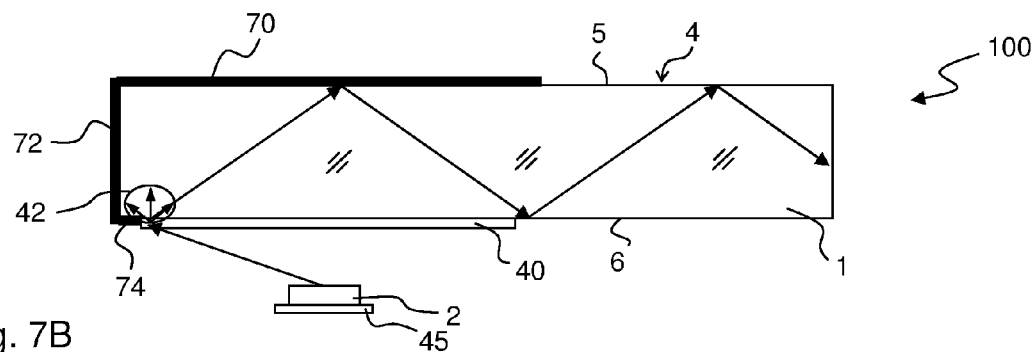
Figure 7C:
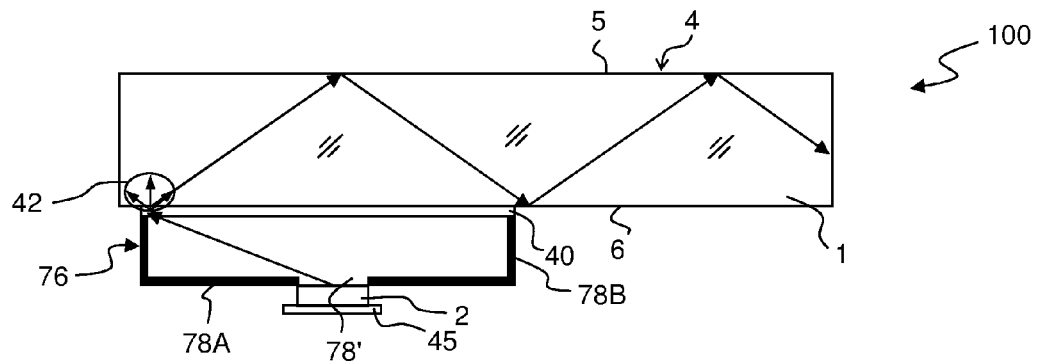

In FIG. 7B, a reflective edge element 72 is provided on the edge surface of the panel 1 to further increase the efficiency of the incoupling, by recycling leakage light directed towards the edge portion (i.e. to the left in FIG. 7B). The reflective edge element 72 may be configured for diffuse reflection. In a variant, the element 72 may be configured for primarily specular reflection. The element 72 may have the additional function of blocking entry of ambient light through the edge surface. As shown, the edge element 72 may be supplemented by a reflective element 74 which is arranged to extend on the rear surface 6 between the diffuser 40 and the edge element 72, to further improve recycling of leakage light. It may be desirable to locate the reflective edge element 72 close to the diffuser 40, so that the element 72 and the diffuser 40 form a common secondary light source for the light coupled into the panel 1. If the element 72 is located further away from the diffuser 40, the reconstruction algorithm may need to be adapted to handle the provision of a further secondary light source formed by the element 72. Alternatively, to facilitate the reconstruction processing, the element 72 may be implemented as a coating of a material that absorbs the light emitted by emitters 2. Suitable light absorbing materials include black paint and black chrome.

In FIG. 7C, a rear-side light recycler 76 is arranged beneath the diffuser 40 to admit at least part of the light from the emitter 2 via an opening 78' which is aligned with the emitter 2. The recycler 76 may be designed to recycle any light that is diffusively (or specularly) reflected by the diffuser 40. As noted above, many materials will not only diffusively transmit incoming light but also diffusively reflect a portion of the incoming light. Furthermore, the recycler 76 may have the function of recycling any leakage light that is reflected back from within the panel 1 and transmitted by the diffuser 40, e.g. by reflection in the element 70 (FIG. 7A), and/or the elements 72, 74 (FIG. 7B).

In the illustrated embodiment, the recycler 76 defines a reflective enclosure around the light-emitting surface of the emitter 2 to promote light to pass the diffuser 40. The recycler 76 comprises a reflective bottom surface 78A with an opening 78' for the emitter 2, and reflective sidewalls 78B that extend from the bottom surface 78A to the diffuser 40. The surface 78A may be specularly reflective. However, it is currently believed that a better incoupling efficiency may be achieved if surface 78A is diffusively reflective. The sidewalls 78B may be specularly or diffusively reflective. The recycler 76 may be configured as a hollow shell, i.e. with an open interior. In an alternative embodiment, the recycler 76 is made of solid, transmissive material with reflective coating.

If the diffuser 40 is configured as individual dots (FIG. 6A), each emitter 2 may be provided with an individual recycler 76 that forms an enclosure around the individual dot/emitter. If the diffuser 40 is configured as a coherent strip (e.g. FIG. 5A), the recycler 76 may also be configured to form an enclosure for each emitter 2. Alternatively, the recycler 76 may be elongated to form an enclosure around a plurality of emitters 2 (and detectors 3, if the detectors 3 are also provided with a recycler, as described further below) along the strip.

In a simplified variant of the embodiment in FIG. 7C, the sidewalls 78B are omitted.

In FIG. 7C, the emitter 2 emits light through its top surface, which is arranged to face the diffuser 40. However, as understood by the skilled person, the use of the recycler 76 enables the use of an emitter 2 that emits light from its side surface, e.g. a so-called side-emitting LED, which may be arranged to project with its light emitting surface into the enclosure via the opening 78' such that the emitted light is reflected/scattered off the surfaces 78A, 78B.

Figure 7D:
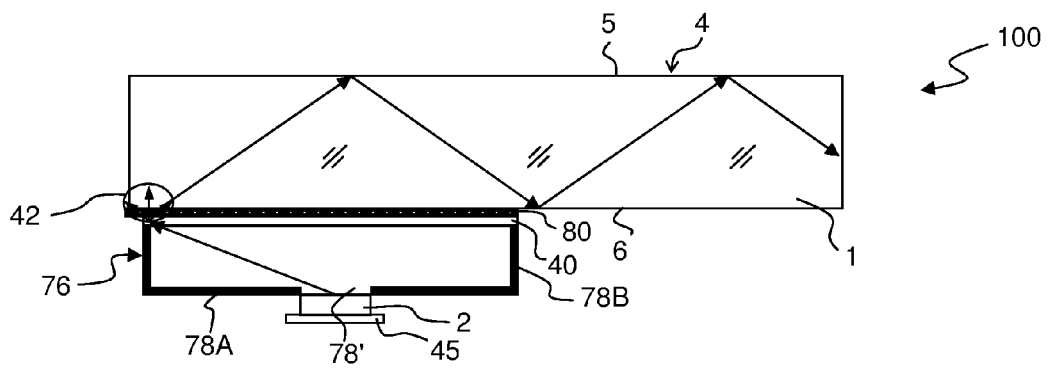

In FIG. 7D, a shield 80 is arranged intermediate the rear surface 6 and the diffuser 40. The shield 80 serves the purpose of hiding the diffuser 40 and the internal structure of the apparatus 100 from view. Therefore, the shield 80 is non-transmissive (opaque) to visible light while being transmissive to the light (in the IR) emitted by emitters 2 and detected by detectors 3. The shield 80 may, but need not, be used in combination with a rear-side light recycler 76 (as shown). In one implementation, the shield 80 is formed as a screen-printed filter made of a plastic material, which is dyed with an IR transparent dye. Such a screen-printed filter may be applied in cost effective manner with well-controlled thickness and location on the panel 1. The use of thin plastic material (or plastic-like material) enables good adhesion to the panel 1, even in the presence of thermal expansion. In a variant, the shield 80 is formed as a spray-on painted filter made of a plastic material. In a further variant, the shield 80 is formed as a pre-produced plastic film with an IR transmitting dye. The pre-produced film 80 may e.g. be laminated or glued to the panel 1. In yet another variant, the shield 80 is formed as an interference filter which is provided on the rear surface 6 of the panel 1. In a further variant, the shield 80 is integrated into the diffuser 40, e.g. by mixing the IR transmissive dye into the bulk material of the diffuser 40.

Figure 8A:
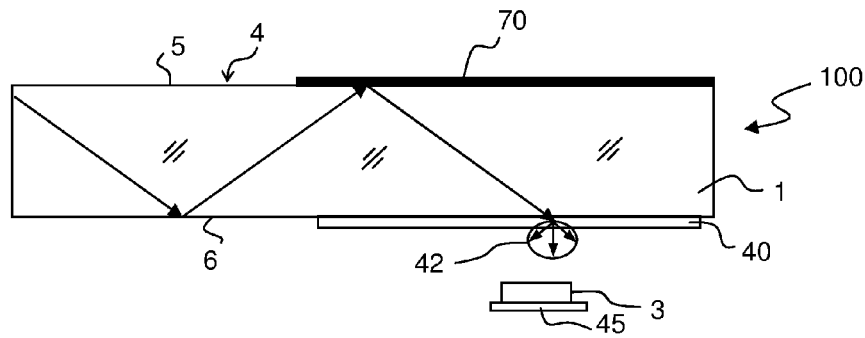
FIGS. 8A-8D are section views of variants of the diffusive outcoupling in FIG. 4B.
Figure 8B:
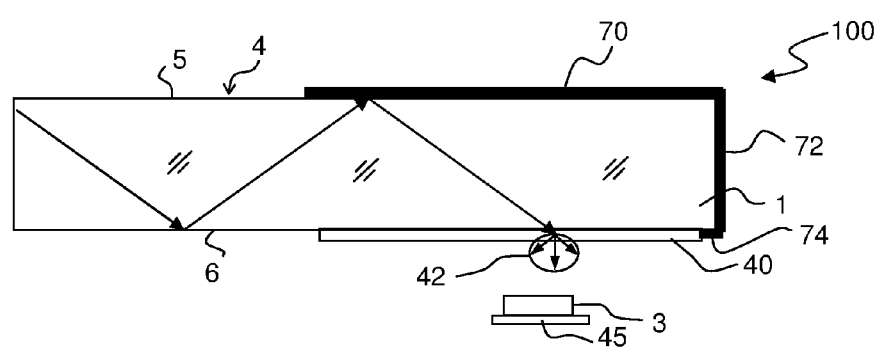
Figure 8C:
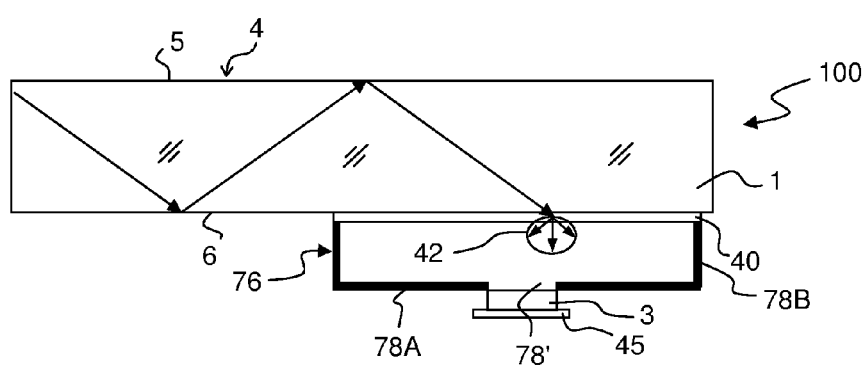
Figure 8D:
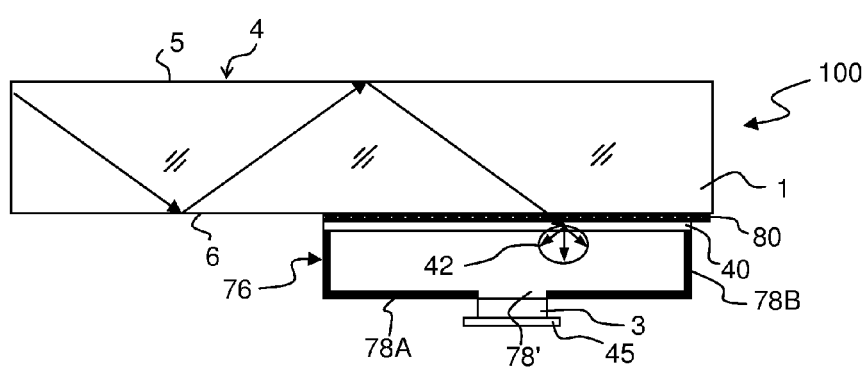

FIGS. 8A-8D illustrate modifications to the outcoupling embodiment in FIG. 4B. In FIG. 8A, a reflective element 70 is applied on top of the diffuser 40 in the same way and for equivalent purpose as the reflective element 70 in FIG. 7A. In FIG. 8B, reflective elements 72, 74 are applied on edge surface and rear surface 6, respectively, of the diffuser 40 in the same way and for equivalent purpose as the reflective elements 72, 74 in FIG. 7B. It is also conceivable that the element 72 may be implemented as a coating of a material that absorbs the light emitted by the emitters 2. In FIG. 8C, a rear-side recycle 76 is provided beneath the diffuser 40 in the same way and for equivalent purpose as the recycler 76 in FIG. 7C. In FIG. 8D, a shield 80 is provided intermediate the rear surface 6 and the diffuser 40 in the same way and for equivalent purpose as the recycler 76 in FIG. 7D.

It is to be understood that each modification described in relation to FIGS. 7A-7D and 8A-8D may be used alone or in combination with one or more of the other modifications.

In the foregoing examples, the emitters 2 and detectors 3 are mounted with an air gap to the diffuser 40. The provision of an air gap may facilitate assembly, and the air gap between the diffuser 40 and the detector 3 may further serve to reduce the sensitivity to ambient light. In an alternative (not shown), the air gap is replaced by an optically transmissive gel, glue or similar filling material, in order to increase the efficiency of the optical coupling. However, this may require the diffuser 40 to be non-refractive, since the refractive power of any refractive structures in the diffuser 40 is likely to be significantly reduced by the provision of a filling material.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, inside a light transmissive panel and detecting, at a number of detectors, a change in the received light caused by an interaction with the transmitted light at the point of touch.

The invention claimed is:

1. A touch-sensitive apparatus, comprising:
   a light transmissive panel that defines a front surface and an opposite, rear surface;
   a plurality of light emitters and a plurality of light detectors arranged to optically face the rear surface along a perimeter of a touch-sensitive region on the light transmissive panel; and
   at least one non-imaging, diffusively transmitting optical element on the rear surface along the perimeter of the touch-sensitive region;
   wherein the plurality of light emitters are configured to emit respective beams of light onto said at least one non-imaging optical element, said at least one non-imaging optical element configured to generate, by diffuse transmission of the respective beams of light, propagating light that propagates by total internal reflection inside the light transmissive panel across the touch-sensitive region; and
   wherein the plurality of light detectors are configured to receive detection light generated, by diffuse transmission, as the propagating light impinges on said at least one non-imaging optical element, to define a grid of propagation paths across the touch-sensitive region between pairs of light emitters and light detectors.

2. The touch-sensitive apparatus of claim 1, wherein said at least one non-imaging optical element comprises:
   at least one elongate strip of diffusively transmitting material.

3. The touch-sensitive apparatus of claim 1, wherein said at least one non-imaging optical element is configured to define a coherent frame that surrounds the touch-sensitive region.

4. The touch-sensitive apparatus of claim 1, wherein said at least one non-imaging optical element has the shape of a sequence of partially overlapping dots, the partially overlapping dots having at least one of an elliptical shape and a circular shape.

5. The touch-sensitive apparatus of claim 1, wherein said at least one non-imaging optical element comprises:
   a plurality of spatially separated dots arranged along the perimeter of the touch-sensitive region.

6. The touch-sensitive apparatus of claim 5, wherein the plurality of spatially separated dots include incoupling dots associated with a respective one of the plurality of light emitters;
   the incoupling dots have an extent on the light transmissive panel of $2 \cdot t \cdot \tan(\theta_{min})$ or less;
   t is the distance between the front and rear surfaces; and
   $\theta_{min}$ is an angle larger than or equal to the critical angle $\theta$, of the light transmissive panel.

7. The touch-sensitive apparatus of claim 5, wherein
   the plurality of spatially separated dots include outcoupling dots associated with a respective one of the plurality of light detectors;
   the outcoupling dots have an extent on the light transmissive panel of at least $2 \cdot t \cdot \tan(\theta_{max})$;
   t is the distance between the front and rear surfaces; and
   $\theta_{max}$ is the largest total internal reflection angle contributing substantially to interaction.

8. The touch-sensitive apparatus of claim 1, wherein said at least one non-imaging optical element is configured to exhibit at least 50% diffuse emission.

9. The touch-sensitive apparatus of claim 1, wherein said at least one non-imaging optical element is a Lambertian diffuser.

10. The touch-sensitive apparatus of claim 1, wherein said at least one non-imaging optical element is non-refracting.

11. The touch-sensitive apparatus of claim 1, wherein said at least one non-imaging optical element comprises:
    refracting structures facing away from the rear surface.

12. The touch-sensitive apparatus of claim 1, further comprising:
    a light reflective top element on the front surface opposite said at least one non-imaging optical element.

13. The touch-sensitive apparatus of claim 12, wherein the light reflective top element is configured to define an opaque frame around the perimeter of the touch-sensitive region.

14. The touch-sensitive apparatus of claim 12, wherein the light reflective top element is configured to be diffusively reflecting to light that impinges on the light reflective top element from within the light transmissive panel.

15. The touch-sensitive apparatus of claim 1, further comprising:
an edge element on an edge portion that connects the front surface and the rear surface of the light transmissive panel adjacent to at least one of (i) each of the plurality of light emitters and (ii) each of the plurality of light detectors, the edge element one of a light reflecting or light absorbing edge element.

16. The touch-sensitive apparatus of claim 1, further comprising:
a light shield between said at least one non-imaging optical element and the rear surface, the light shield configured to transmit at least a portion of the light emitted by the plurality of light emitters while blocking visible light.

17. The touch-sensitive apparatus of claim 1, wherein said at least one non-imaging optical element includes a dye configured to transmit at least a portion of the light emitted by the plurality of light emitters while blocking visible light.

18. The touch-sensitive apparatus of claim 1, wherein the plurality of light emitters and the plurality of light detectors are arranged relative to said at least one non-imaging optical element such that adjacent propagation paths partially overlap along their extent across the touch-sensitive region.

19. The touch-sensitive apparatus of claim 8, wherein said at least one non-imaging optical element is configured to exhibit at least 90% diffuse emission.

20. The touch-sensitive apparatus of claim 10, wherein said at least one non-imaging optical element is a film of diffusing particles.

21. The touch-sensitive apparatus of claim 1, wherein the at least one non-imaging optical element is an interface between the light transmissive panel and a medium of lower refractive index than the light transmissive panel.

22. A touch-sensitive apparatus, comprising:
a light transmissive panel that defines a front surface and an opposite, rear surface;
a plurality of light emitters arranged to optically face the rear surface along a perimeter of a touch-sensitive region on the light transmissive panel;
a plurality of light detectors optically coupled to the light transmissive panel; and
at least one non-imaging, diffusively transmitting optical element arranged on the rear surface along the perimeter of the touch-sensitive region;
wherein the plurality of light emitters are configured to emit respective beams of light onto said at least one non-imaging, diffusively transmitting optical element, said at least one non-imaging, diffusively transmitting optical element configured to generate, by diffuse transmission of the respective beams of light, propagating light that propagates by total internal reflection inside the light transmissive panel across the touch-sensitive region; and
wherein the plurality of light detectors are arranged to define a grid of propagation paths across the touch-sensitive region between pairs of light emitters and light detectors.

23. A touch-sensitive apparatus, comprising:
a light transmissive panel that defines a front surface and an opposite, rear surface;
a plurality of light emitters optically coupled to the light transmissive panel to generate propagating light that propagates by total internal reflection inside the light transmissive panel across a touch-sensitive region on the light transmissive panel;
a plurality of light detectors arranged to optically face the rear surface along a perimeter of the touch-sensitive region on the light transmissive panel; and
at least one non-imaging, diffusively transmitting optical element arranged on the rear surface along the perimeter of the touch-sensitive region;
wherein the plurality of light detectors are configured to receive detection light generated, by diffuse transmission of the propagating light by said at least on non-imaging, diffusively transmitting optical element, to define a grid of propagation paths across the touch-sensitive region between pairs of light emitters and light detectors.

* * * * *